US005142298A

United States Patent [19]

Hoffmann et al.

[11] Patent Number: 5,142,298

[45] Date of Patent: Aug. 25, 1992

[54] METHOD OF MARKING ELONGATED MATERIAL

[75] Inventors: Ernst Hoffmann; Harry Staschewski; Siegfried Wandelt, all of Langenhagen, Fed. Rep. of Germany

[73] Assignee: kabelmetal electro Gesellschaft mit beschränkter Haftung, Hanover, Fed. Rep. of Germany

[21] Appl. No.: 459,566

[22] Filed: Jan. 2, 1990

[30] Foreign Application Priority Data

Jan. 4, 1989 [DE] Fed. Rep. of Germany ....... 3900142

[51] Int. Cl.[5] .......... G01D 15/18

[52] U.S. Cl. .......... 346/1.1; 346/75; 346/140 R

[58] Field of Search .......... 346/1.1, 75, 140 R

[56] References Cited

U.S. PATENT DOCUMENTS 4,122,457 10/1978 Erinson et al. .......... 346/75

FOREIGN PATENT DOCUMENTS 1465660 6/1969 Fed. Rep. of Germany .
60-104335 6/1985 Japan .

*Primary Examiner*—Benjamin R. Fuller
*Assistant Examiner*—Gerald E. Preston
*Attorney, Agent, or Firm*—Martin A. Farber

[57] ABSTRACT

A method for the continuous marking of elongated material (1) which is moved in its longitudinal direction, by which ring-shaped markings which are limited in axial direction are applied to the surface of the material (1) by means of ink jets (2). The ink jets (2) emerge under pressure from two nozzles (6, 7) which are arranged parallel to each other and swing continuously on a swing shaft (5). If only one nozzle (6) is to function, the other nozzle (7) is closed by a 3/2-way valve (20). At the same time, a bypass (18) is opened through which the quantity of ink intended for the disconnected nozzle (7) is conducted away. The ink jet (2) of the still functioning nozzle (6) is then retained without change.

7 Claims, 2 Drawing Sheets

METHOD OF MARKING ELONGATED MATERIAL

FIELD AND BACKGROUND OF THE INVENTION

The present invention relates to a method of continuously marking material which is to be moved in its longitudinal direction, wherein annular markings of limited axial extent are applied to the surface of the material by jets of ink (color) which emerge under pressure from at least two nozzles which are parallel to each other and swing continuously around an axis of swing. The jets impinge on the surface of the material at a right angle to its direction of movement, and the nozzles are supplied with ink by a common pump via a feedline (West German Patent 14 65 660).

"Elongated material" within the meaning of the invention comprises, for instance, electric lines, such as control lines or else insulated wires of communication cables to which the following remarks refer, by way of example, to all other applications.

The color marking of wires is required for communication cables so as to permit easy identification of individual wires for installation. Thus, for instance, in the case of four wires which are to be stranded into a quad, rings are sprayed onto the insulation of three of said wires, each wire being marked differently. The fourth wire remains unmarked. The marking of the three wires can be effected in the manner that the first wire is marked with single rings, the second wire with double rings spaced a short distance apart and the third wire with double rings spaced a larger distance apart, or that the wires ar provided with markings of a different color. The individual markings are applied at uniform distances apart.

The aforementioned German Patent 14 65 660 describes a method in which a device is used which has become known under the commercial name "Colormat". By means of this device the markings are sprayed onto the wires of the conductors immediately after the application of the insulating material to the wires. The ink jets therefore impinge on a relatively hot insulation so that the ink dries quickly and is firmly bonded to the insulating material. In this known method, two nozzles are used, which are arranged parallel to each other and produce on the insulation of a wire two rings which are a fixed distance apart from each other. If this type of marking of the wire is to be changed to only one ring, then either a new nozzle system with only one nozzle must be installed or the feeding of ink to one of the two nozzles must be interrupted. The changing of the nozzle system is time-consuming as production must be halted, while a second nozzle system means increased costs. If in the case of a nozzle system having two parallel nozzles the feeding of ink to one nozzle is interrupted, problems also result since the entire quantity of ink delivered by the common pump is now fed to the one nozzle which is still open. Due to the now increased speed of discharge of the ink jet from the nozzle, the wave length of the jet is increased. This leads to an impermissible change in the markings sprayed on the wire.

SUMMARY OF THE INVENTION

It is an object of the present invention to provide a method of applying markings to an electric wire or other elongated material with the use of a nozzle system having at least tow parallel nozzles in which assurance is had, in simple manner, that the quality of the markings sprayed on will not be changed even if one of the nozzles is disconnected from the ink supply.

Accordingly, a method of the above-described type provides, in accordance with the invention, that upon the disconnecting of one of the nozzles, (6, 9) from the feedline (12, 13), a bypass (18) connected to said line is simultaneously opened, via which the quantity of ink intended for the disconnected nozzle (6–9) is led away.

With the use of this method the amount of ink which is fed to the individual nozzles is always the same. This is true, in particular, when the feeding of ink to one of the nozzles is interrupted since the amount of ink intended for that nozzle is conducted away by the bypass. The speed of discharge of the jets of ink from the nozzles therefore remains unchanged, regardless of how many nozzles are supplied with ink and without it being necessary, for instance, to change the delivery of the pump for this purpose. Accordingly, the quality of the ring-shaped markings sprayed onto the conductor is retained regardless of whether only one marking or two or more markings are simultaneously sprayed on.

Accordingly to a feature of the invention the amount of ink flowing through the bypass (18) is adjustable.

According to a further feature, a 3/2-way valve (19) is used for disconnecting the nozzle (6–9) and simultaneously opening the bypass (18).

Also according to another feature a solenoid valve is used as valve (20).

Still further a feature is that a pneumatically operated valve is used as valve (20).

Moreover another feature is that the nozzle (6–9) and the bypass (18) are each cleaned is disconnected condition.

BRIEF DESCRIPTION OF THE DRAWINGS

With the above and other object and advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
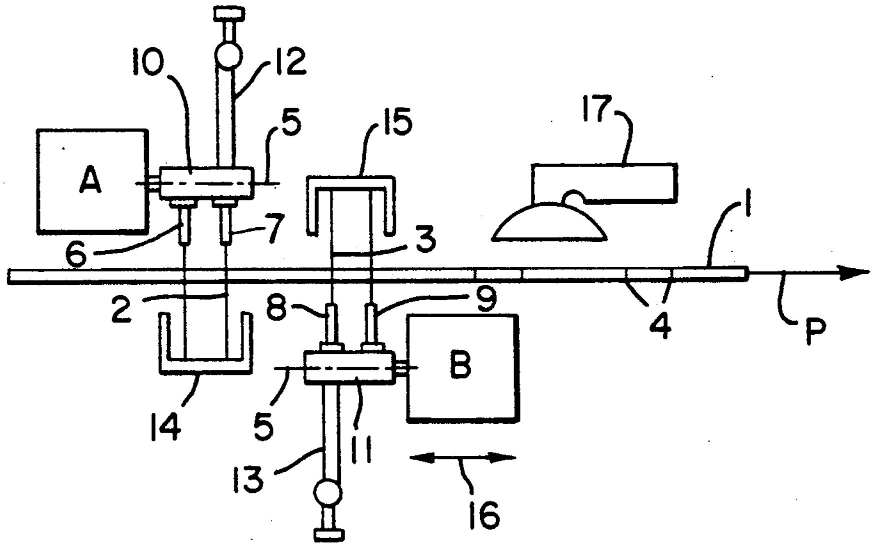
FIG. 1 is a device for carrying out the method, shown diagrammatically.

The device shown in the drawings operates with nozzle systems in which two nozzles are arranged parallel to each other. However, nozzle systems having more than two parallel nozzles which are supplied with ink via a feedline from a common pump can also be used.

In the device according to FIG. 1, two nozzle systems A and B are arranged on opposite sides of a wire 1 or other elongated material travelling in the direction of an arrow P, and are staggered with respect to each other in the axial direction of the wire 1 in such a manner that markings applied by the ink jets 2 of the nozzle system A on one side of the wire 1 are supplemented by ink jets 3 of the nozzle system B so as to form complete rings 4. The nozzle systems A and B oscillate with an adjustable frequency on swing shafts 5 so that the ink jets 2 and 3 which emerge under pressure from the nozzles 6 and 7 of the nozzle system A and the nozzles 8 and 9 of the nozzle system B, respectively, oscillate with pre-determined amplitude and wave length.

The nozzle bodies 10 and 11 which bear the nozzles 6 and 7 and 8 and 9 respectively are connected via feedlines 12 and 13 respectively to a storage container for ink from which they are supplied with ink by a pump. Storage container and pump have not been shown in order not to clutter the drawing. The feedlines 12 and 13 can be flexible. The ink bowls 14 and 15 arranged respectively on the side of the wire 1 opposite the nozzle bodies 10 and 11 serve to collect ink from the continuously oscillating ink jets 2 and 3, and to conduct the excess ink back into the ink storage container.

Figure 2:
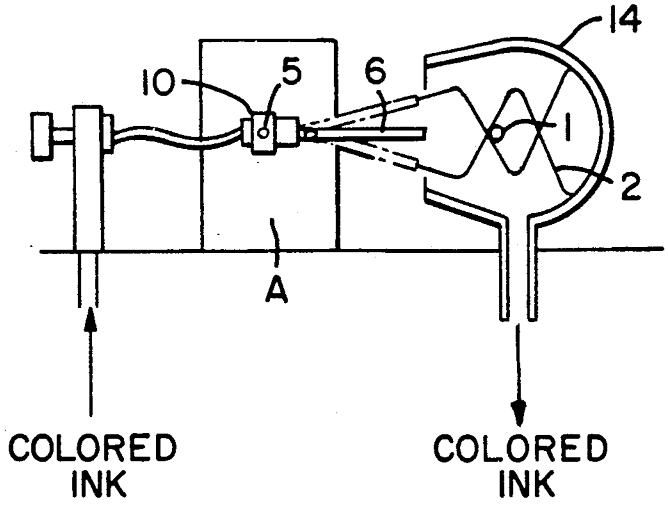
FIGS. 2 and 3 show details, partially diagrammatically, of the device on a larger scale, with FIG. 3 being a sectional view.

The nozzle system B is displaceable parallel to the wire 1 as indicated by the double arrow 16, so as to cause the overlapping of the half rings produced by the ink jets 2 and 3 of the nozzles A and B. A high speed flash stroboscope 17 serves to verify the overlapping of the half rings for the formation of the closed rings 4 during manufacture, in which the wire 1 is pulled off at very high speed in the direction of the arrow P. Upon a swinging around the swing shafts 5, the nozzles 6 to 9 carry out a swinging motion, the limits of which are indicated in dash-dot line in FIG. 2 for the nozzle 6 of the nozzle system A. The ink jet 2 emerging from the nozzle 6 moves, with uniform continuous swinging, over sinusoidal paths which are also shown in FIG. 2. In this way a half-ring is produced on one side of the wire 1, for instance, by the nozzle system A, which half-ring is subsequently supplemented by the ink jet 3 of the nozzle system B to form the complete ring 4.

Figure 3:
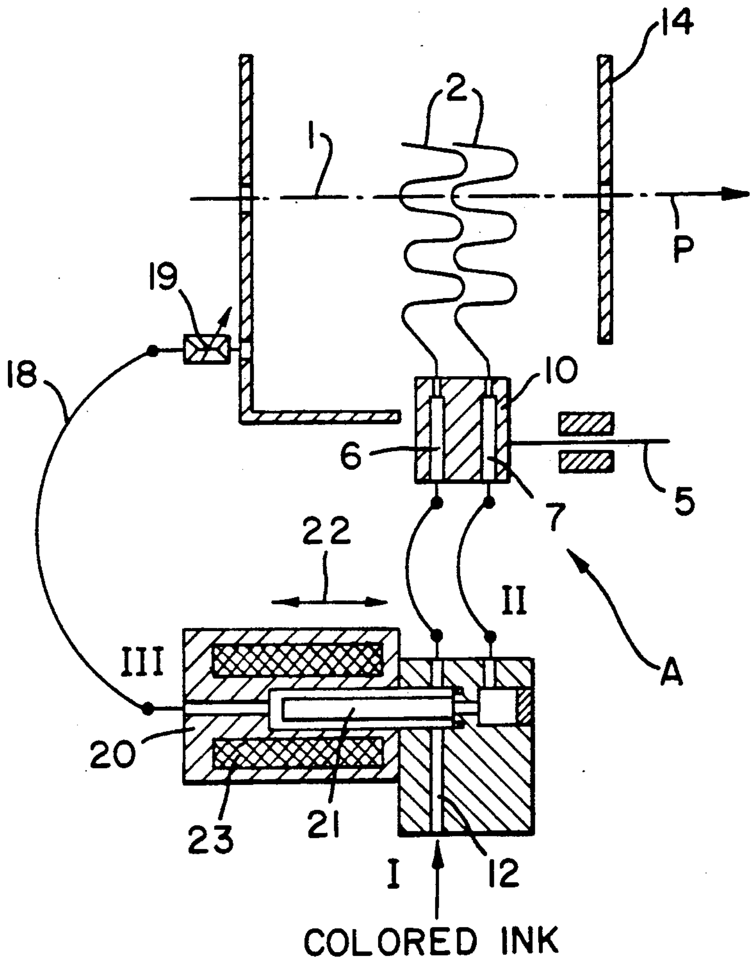

With the method described, two markings can be simultaneously sprayed as rings 4 onto the wire 1. If only one marking is to be sprayed on with the same device and without changing the ink supply of the nozzle systems A and B, one proceeds, for instance, as follows:

FIG. 3 shows diagrammatically, in a further enlarged scale, a detail of FIG. 1, only the nozzle system A being shown, for the sake of simplicity. Furthermore, in this figure, the ink bowl 14 is shown in a manner as though the swing system 10 extends into it. The ink is fed to the nozzle system A via the feedline 12 and divided in the nozzle system over the two nozzles 6 and 7. Of the two nozzles 6 and 7 which are initially in use, the nozzle 7, for instance, is to be disconnected from the ink feed. For this purpose, a bypass 18 is connected to the feedline 12, the bypass being opened at the moment when the nozzle 7 is closed. In the embodiment shown, the bypass 18 conducts the ink directly to the ink bowl 14 in the same quantity as was intended for the nozzle 7. The bypass 18 could however, for instance, also lead to the storage container for the ink and conduct the quantity of ink which is shunted off directly back into it.

Before the placing in operation of the entire device, the bypass 18 must be dimensioned, or its cross-section adjusted. This cross-section must be so selected that the same quality of ink as would be supplied to the nozzle 7, if it were open, is conducted away. In this way, assurance is had that the quantity of ink which is still being conducted to the nozzle 6 remains the same, so that the speed of discharge of the ink jet 2 from the nozzle 6 is not changed. The amplitude and wave length of the ink jet 2 of the nozzle 6 are therefore retained, so that the only ring-shaped marking which is now sprayed onto the wire 1 can be produced has a closed ring 4 with sharp contours. For the adjustment of the bypass 18, a throttle valve 19 can be arranged in it by means of which the cross-section or the quantity of ink to be conducted away via the bypass 18 can be adjusted precisely in a particularly simple manner.

If the nozzle 7 is to be disconnected from the ink feed, this can be effected, in principle, by a valve which is then closed. At the same time, the bypass 18 could be opened via a further valve. The two valves must then be so coordinated with respect to each other that they are simultaneously closed and opened.

As preferred embodiment, a 3/2-way valve 20 is used for closing the nozzle 7 and opening the bypass 18, the opening for the nozzle 7 being closed and that for the bypass 18 opened simultaneously by a movement of the valve body or armature 21 or of a corresponding control element. In FIG. 3, the valve 20 is shown as a solenoid valve which includes the armature 21 which can be moved in the direction of the double arrow 22 and which, in one end position, closes the opening for the bypass 18 while in the other end position, closes the opening for the nozzle 7. At the same time, the corresponding other openings are opened. The armature 21 can be energized by a coil 23 and can be brought into the corresponding position. It is only shown diagrammatically in FIG. 3. Guide elements for the armature 21 have been omitted for the sake of simplicity of the drawing.

The development of the valve 20 as solenoid valve is the simplest. The directional control valve could, however, also be developed as a pneumatic or hydraulic 3/2-way valve 209 which has in all cases 3 ways, namely way I for feeding the ink, way II for discharging the ink through the nozzle 7, and way III for conducting the ink away through the bypass 18. The "2" stands, for instance, for the two positions of the armature 21 of the solenoid valve shown.

If the nozzle 7 is disconnected from the ink feed and this condition is retained for a long period of time, the ink contained in the nozzle 7 and its feedline must, if possible, be removed so that the nozzle 7 does not clog. The same applies, in principle, for the bypass 18 if it is disconnected again from the ink feed or if it is not needed for conducting the ink away. Both the nozzle 7 and its feed line as well as the bypass 18 are therefore advisedly cleaned after disconnecting the ink feed so that they are available for further use. The nozzle system can then also be switched again without interruption to both nozzles 6 and 7 in order to produce two rings 4. Herein the term ink is intended to include a color marking medium, or the like and even a black marking liquid.

We claim:

1. A method of continuously marking material, during a moving of the material in its longitudinal direction, by applying annular marking of limited axial extend, comprising the steps of:

applying to a surface of the material jets of ink which emerge under pressure from at least two nozzles which are parallel to each other and swing continuously around an axis of swing; allowing the jets of ink to impinge on the surface of the material at a right angle to a direction of movement of the material, the nozzles being supplied with ink by a common pump and via a feedline;

disconnecting one of the nozzles from the feedline; and connecting a bypass to said feedline simultaneously with said step of disconnecting, the bypass allowing a quantity of ink intended for a disconnected nozzle to be led away via a path distant from said material.

2. The method according to claim 1, further comprising the step of adjusting an amount of ink flowing through the bypass.

3. The method according to claim 1, further comprising a step of cleaning the nozzles and the bypass in disconnected condition.

4. An apparatus for carrying out a marking of elongated material with ink from ink jets by applying annular markings of limited axial extent, the apparatus being operative to apply to a surface of the material jets of ink which emerge under pressure from at least two nozzles which are parallel to each other and swing continuously around an axis of swing;

the apparatus being operative to allow the jets of ink to impinge on the surface of the material at a right angle to a direction of movement of the material, the nozzles being supplied with ink by a common pump and via a feedline;

a plurality of nozzles;

a feedline connectable to a pump for supplying ink to the nozzles;

a bypass for bypassing ink past a first of said nozzles via a path distant from said material; and a 3/2-way valve connected between said feedline and said first nozzle and said bypass, said 3/2-way valve serving for disconnecting said first nozzle and simultaneously opening said bypass.

5. The apparatus according to claim 4, wherein said bypass is adjustable for adjusting an amount of ink flowing through the bypass.

6. The apparatus according to claim 4, wherein said valve is a solenoid valve.

7. The apparatus according to claim 4, wherein said valve is a pneumatically operated valve.

* * * * *